United States Patent
Kim et al.

(10) Patent No.: US 9,492,955 B2
(45) Date of Patent: Nov. 15, 2016

(54) MOLDING PROCESS OF HIGHLY HEAT-RESISTANT SOUND ABSORBING AND INSULATING MATERIALS

(71) Applicants: Hyundai Motor Company, Seoul (KR); Kia Motors Corporation, Seoul (KR)

(72) Inventors: Keun Young Kim, Gyeonggi-Do (KR); Won Jin Seo, Gyeonggi-Do (KR); Jong Beom Seo, Seoul (KR); Chi Man Cho, Gyeonggi-Do (KR); Ki Dong Lee, Gyeonggi-Do (KR); Su Nam Lee, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/441,085

(22) PCT Filed: Nov. 6, 2013

(86) PCT No.: PCT/KR2013/010026
§ 371 (c)(1),
(2) Date: May 6, 2015

(87) PCT Pub. No.: WO2014/073859
PCT Pub. Date: May 15, 2014

(65) Prior Publication Data
US 2015/0266214 A1    Sep. 24, 2015

(30) Foreign Application Priority Data

Nov. 6, 2012  (KR) .................. 10-2012-0124955

(51) Int. Cl.
| | | |
|---|---|---|
| G01K 11/16 | (2006.01) |
| B29C 43/52 | (2006.01) |
| B29C 44/12 | (2006.01) |
| G10K 11/16 | (2006.01) |
| B29C 44/10 | (2006.01) |
| B29C 33/58 | (2006.01) |
| B29C 43/14 | (2006.01) |
| D04H 1/488 | (2012.01) |
| G10K 11/162 | (2006.01) |
| B60R 13/08 | (2006.01) |
| B29K 105/04 | (2006.01) |
| B29K 105/12 | (2006.01) |
| B29K 63/00 | (2006.01) |
| B29L 31/00 | (2006.01) |
| B29K 101/10 | (2006.01) |

(52) U.S. Cl.
CPC .............. *B29C 43/52* (2013.01); *B29C 33/58* (2013.01); *B29C 43/14* (2013.01); *B29C 44/10* (2013.01); *B29C 44/1266* (2013.01); *B60R 13/0876* (2013.01); *D04H 1/488* (2013.01); *G10K 11/16* (2013.01); *G10K 11/162* (2013.01); *B29C 2043/141* (2013.01); *B29K 2063/00* (2013.01); *B29K 2101/10* (2013.01); *B29K 2105/04* (2013.01); *B29K 2105/12* (2013.01); *B29K 2277/10* (2013.01); *B29K 2995/0002* (2013.01); *B29K 2995/0015* (2013.01); *B29K 2995/0016* (2013.01); *B29K 2995/0017* (2013.01); *B29L 2031/721* (2013.01); *Y10T 29/49572* (2015.01)

(58) Field of Classification Search
CPC ....... B29C 43/52; B29C 33/58; B29C 44/10; B29C 44/1266; B29C 43/14; B29C 2043/141; G10K 11/16; Y10T 29/49572; B29K 2277/10; B29K 2063/00; B29K 2995/0016; B29K 2105/04; B29K 2995/0002; B29K 2105/12; B29L 2031/721
See application file for complete search history.

(56) References Cited

U.S. PATENT DOCUMENTS

| | | | |
|---|---|---|---|
| 5,945,643 A | 8/1999 | Casser | |
| 6,651,726 B2 * | 11/2003 | Suzuki | B22D 17/2007 164/267 |
| 8,393,438 B2 | 3/2013 | Ogawa et al. | |
| 8,997,925 B2 * | 4/2015 | Kim | B32B 27/00 181/284 |

| | | | |
|---|---|---|---|
| 2002/0011691 A1 | 1/2002 | Suzuki et al. | |
| 2003/0066708 A1 | 4/2003 | Allison et al. | |
| 2004/0169373 A1 | 9/2004 | Wolaver | |
| 2009/0056668 A1 | 3/2009 | Hazelton | |
| 2010/0065366 A1 | 3/2010 | Soltau et al. | |
| 2010/0122870 A1 | 5/2010 | Fonville et al. | |
| 2015/0283960 A1 | 10/2015 | Kim et al. | |

FOREIGN PATENT DOCUMENTS

| | | |
|---|---|---|
| CN | 101153428 A | 4/2008 |
| CN | 101601085 A | 12/2009 |
| EP | 1621408 A1 | 2/2006 |
| JP | 2002-287767 A | 10/2002 |
| JP | 2003-201658 A | 7/2003 |
| JP | 2003-293256 A | 10/2003 |
| JP | 2012-086838 | 5/2012 |
| KR | 10-0241133 | 11/1999 |
| KR | 10-2006-0003276 | 1/2006 |
| KR | 10-2006-0013468 | 2/2006 |
| KR | 10-2007-0046019 A | 5/2007 |
| KR | 10-0832358 | 5/2008 |
| KR | 10-2011-0055009 | 5/2011 |
| KR | 10-2011-0102077 | 9/2011 |
| WO | 98/30375 A1 | 7/1998 |
| WO | 2004/107314 A1 | 12/2004 |
| WO | 2012/008473 A1 | 1/2012 |
| WO | 2012/101192 A1 | 8/2012 |

OTHER PUBLICATIONS

International Search Report dated Jan. 28, 2014 for PCT/KR/2013/010026.

* cited by examiner

*Primary Examiner* — Richard Chang

(74) *Attorney, Agent, or Firm* — Mintz Levin Cohn Ferris Glovskyand Popeo, P.C.; Peter F. Corless

(57) ABSTRACT

The present invention relates to a method for molding a highly heat-resistant sound absorbing and insulating material, which uses a sound absorbing material containing 20-80 parts by weight of a fiber material having a limiting oxygen index (LOI) of 25% or greater and a heat resistance temperature of 200° C. or greater and 20-80 parts by weight of a thermosetting binder resin having a heat resistance temperature of 200° C. or greater and is installed on an engine cylinder block and an automotive body panel above a muffler of a vehicle. More specifically, the method includes a releasing agent coating step of coating a releasing agent inside a hot die, a hot compression molding step of fixing a shape, and a cold compression step of stabilizing the shape. The highly heat-resistant sound absorbing and insulating material molded according to the method can reduce the noise inside a vehicle by blocking radiated noise, which is generated from an engine and an exhaust system, from being transferred to the inside of the vehicle through an automotive body panel, can maintain its shape even under a high-temperature environment of 200° C. or greater generated by the engine and the exhaust system, and can satisfy UL 94V-0 flame retardancy.

14 Claims, 7 Drawing Sheets

(a)

(b)

(c)

(d)

(e)

MOLDING PROCESS OF HIGHLY HEAT-RESISTANT SOUND ABSORBING AND INSULATING MATERIALS

CROSS-REFERENCE TO RELATED APPLICATIONS

This application claims priority under 35 U.S.C. §119 to Korean Patent Application No. 10-2012-0124955, filed on Nov. 6, 2012, in the Korean Intellectual Property Office, the disclosure of which is incorporated herein by reference in its entirety.

BACKGROUND (a) Technical Field

The present invention relates to a method for molding a highly heat-resistant sound absorbing and insulating material, which uses a sound absorbing material containing 20-80 parts by weight of a fiber material having a limiting oxygen index (LOI) of 25% or greater and a heat resistance temperature of 200° C. or greater and 20-80 parts by weight of a thermosetting binder resin having a heat resistance temperature of 200° C. or greater and is installed on an engine cylinder block and an automotive body panel above a muffler of a vehicle. More specifically, the method includes a releasing agent coating step of coating a releasing agent inside a hot die, a hot compression molding step of fixing a shape, and a cold compression step of stabilizing the shape.

(b) Background Art

Various noises are generated while driving a vehicle. The vehicle noise is mainly generated from an engine or an exhaust system and is transferred to the inside of a vehicle by air. A sound absorbing and insulating material is used to reduce the noise generated from the engine and the exhaust system from being transferred to the inside of the vehicle. An insulation dash, a dash isolation pad and the like are used to block the noise radiating from the engine from being transferred to the inside of the vehicle, and a tunnel pad, a floor carpet and the like are used to block the noise generated from the exhaust system and the floor from being transferred to the inside of the vehicle.

As sound absorbing materials for a vehicle, Korean Patent Publication No. 2004-0013840 discloses a 20-mm thick sound absorbing and insulating material having a PET fiber layer in which a synthetic resin film layer having a thickness of 40-100 μm in the lengthwise direction is inserted, and Korean Patent Publication No. 2002-0089277 discloses a process for preparing a sound absorbing insulation material of a nonwoven fabric form by cutting and beating a polyester fiber and an acrylic fiber, mixing with a low-melting-point polyester fiber at a specific ratio, and molding and heating the same. And, Korean Patent Publication No. 2006-0043576 discloses a method of coating at least one of a top layer and a bottom layer of a polyester (PET) felt with a resin, using a mixture fiber of a low-melting-point fiber (LMF) and a regular fiber.

However, for the existing insulation dash and insulation hood, although a resin felt using phenol powder as a binder, or a glass wool or semicrystalline polyurethane foam product using a phenol resin as a binder can be molded simply by a hot compression molding process within 60 seconds, they cannot maintain their shape under a high-temperature environment of 200° C. or greater or do not have superior flame retardancy. For this reason, they cannot be directly installed on an engine cylinder block or an automotive body panel above a muffler.

Further, a dash isolation pad, a tunnel pad and a floor carpet using a low-melting-point polyethylene terephthalate (LM-PET) fiber, which is a thermoplastic binder, have poor flame retardancy. Although a thermosetting binder resin having a heat resistance temperature of 200° C. or greater has to be used for direct installation on an engine cylinder block or an automotive body panel above a muffler, product molding is impossible through pre-heating followed by cold compression molding.

SUMMARY

The present invention is directed to providing a method for molding a highly heat-resistant sound absorbing and insulating material which does not change in shape under a high-temperature environment of 200° C. or greater as being adjacent to the noise source of an engine or an exhaust system, and satisfies UL 94V-0 flame retardancy.

The present invention is also directed to providing a method for reducing noise by applying the sound absorbing and insulating material to a noise generating device.

In one aspect, the present invention provides a method for molding a highly heat-resistant sound absorbing and insulating material, including: i) a releasing agent coating step of coating a releasing agent inside a hot die; ii) a hot compression molding step of fixing a shape of a sound absorbing material by installing a sound absorbing material containing 20-80 parts by weight of a fiber material having a limiting oxygen index (LOI) of 25% or greater and a heat resistance temperature of 200° C. or greater and 20-80 parts by weight of a thermosetting binder resin having a heat resistance temperature of 200° C. or greater on the hot die coated with the releasing agent; and iii) a cold compression step of stabilizing the shape of the compressed sound absorbing material.

In an exemplary embodiment of the present invention, in the releasing agent coating step i), a spray-up type releasing agent prepared by diluting an emulsion with water to a concentration of 10-90% may be uniformly coated onto top and bottom surfaces inside the hot die in an amount of 20-100 g/m$^2$.

In another exemplary embodiment of the present invention, the emulsion may be one or more selected from the group consisting of a silicon-based emulsion and a fluorine-based emulsion.

In an exemplary embodiment of the present invention, in the hot compression molding step ii), the sound absorbing material may be installed on the hot die coupled with a hot press and hot compression may be performed at a pressure of 60-200 kgf/cm$^2$ for 60-300 seconds with the surface temperature of the hot die maintained at 150-230° C. to fix its shape.

In another exemplary embodiment of the present invention, the sound absorbing material may contain a nonwoven fabric containing a fiber material and a thermosetting binder resin which is located in the same layer as the nonwoven fabric and is impregnated in the nonwoven fabric while maintaining a three-dimensional structure inside the nonwoven fabric, the thermosetting binder resin being distributed uniformly on the entire fiber yarn of the nonwoven fabric and forming smaller-sized vent holes as compared to before the impregnation of the binder.

In another exemplary embodiment of the present invention, the sound absorbing material may be prepared by immersing the nonwoven fabric in a thermosetting binder resin solution, compressing at a pressure of 1-20 kgf/cm$^2$.

In another exemplary embodiment of the present invention, the sound absorbing material may be one in which 1-300 parts by weight of the thermosetting binder resin is impregnated based on 100 parts by weight of the nonwoven fiber.

In another exemplary embodiment of the present invention, the fiber material may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

In another exemplary embodiment of the present invention, the fiber material may be one or more selected from the group consisting of a meta-aramid (m-aramid) fiber and a para-aramid (p-aramid) fiber.

In another exemplary embodiment of the present invention, the nonwoven fabric may be a single-layer nonwoven fabric formed of an aramid fiber having a fineness of 1-15 denier and a thickness of 3-20 mm.

In another exemplary embodiment of the present invention, the nonwoven fabric may have a density of 100-2000 g/m$^2$.

In another exemplary embodiment of the present invention, the thermosetting binder resin may contain an epoxy resin, 1-20 wt % of a curing agent based on the weight of the epoxy resin, 1-10 wt % of a catalyst based on the weight of the epoxy resin and 10-40 wt % of a flame retardant based on the weight of the epoxy resin.

In another exemplary embodiment of the present invention, the epoxy resin may be one or more selected from the group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

In an exemplary embodiment of the present invention, in the cold compression step iii), the sound absorbing material may be installed on a cold die coupled with one selected from the group consisting of a cold press and a compression jig and cold compression may be performed for 5 seconds or greater with the surface temperature of the cold die maintained at 20-40° C.

In another exemplary embodiment of the present invention, the cold compression may be performed for 30-60 seconds.

In another aspect, the present invention provides a method for reducing noise of a noise generating device, including: i) identifying the three-dimensional shape of a noise generating device; ii) molding a sound absorbing and insulating material by the method so as to correspond partially or entirely to the three-dimensional shape of the device; and iii) bringing the sound absorbing and insulating material adjacent to the noise generating device.

In an exemplary embodiment of the present invention, the device may be a motor, an engine or an exhaust system.

In an exemplary embodiment of the present invention, said bringing the sound absorbing and insulating material adjacent to the noise generating device may include closely attaching the sound absorbing and insulating material to the noise generating device, installing the sound absorbing and insulating material to be spaced apart from the noise generating device or molding the sound absorbing and insulating material as a part of the noise generating device.

The method for molding a highly heat-resistant sound absorbing and insulating material according to the present invention provides a highly heat-resistant sound absorbing and insulating material which is installed adjacent to a noise source of an engine or an exhaust system and reduces noise radiating from the engine or the exhaust system.

BRIEF DESCRIPTION OF THE DRAWINGS

FIG. 2(A) is an image of a nonwoven fabric prepared by needle punching. FIGS. 2(B) and 2(C) show images of binder-impregnated nonwoven fabrics. FIG. 2(B) is an image of a binder-impregnated nonwoven in which 20 parts by weight of a thermosetting binder resin is impregnated in 80 parts by weight of a nonwoven fabric, and FIG. 2(C) is an image of a binder-impregnated nonwoven fabric in which 50 parts by weight of a thermosetting binder resin is impregnated in 50 parts by weight of a nonwoven fabric.

FIG. 3(a) shows an image of a sound absorbing and insulating material molded for use in a vehicle engine, and FIG. 3(b) shows an image of the sound absorbing and insulating material installed on a part of a vehicle engine.

FIG. 4(a) shows an image of a sound absorbing and insulating material molded for use in a lower part of a vehicle, and FIG. 4(b) shows an image of the sound absorbing and insulating material installed on a lower part of a vehicle.

FIG. 5(a) shows a shape of a sound absorbing and insulating material molded in Example 1; FIG. 5(b) shows a shape of a sound absorbing and insulating material molded in Comparative Example 1; FIG. 5(c) shows a shape of a sound absorbing and insulating material molded in Comparative Example 2; FIG. 5(d) shows a shape of a sound absorbing and insulating material molded in Comparative Example 3; and FIG. 5(e) shows a shape of a sound absorbing and insulating material molded in Comparative Example 4.

DETAILED DESCRIPTION

Figure 1:
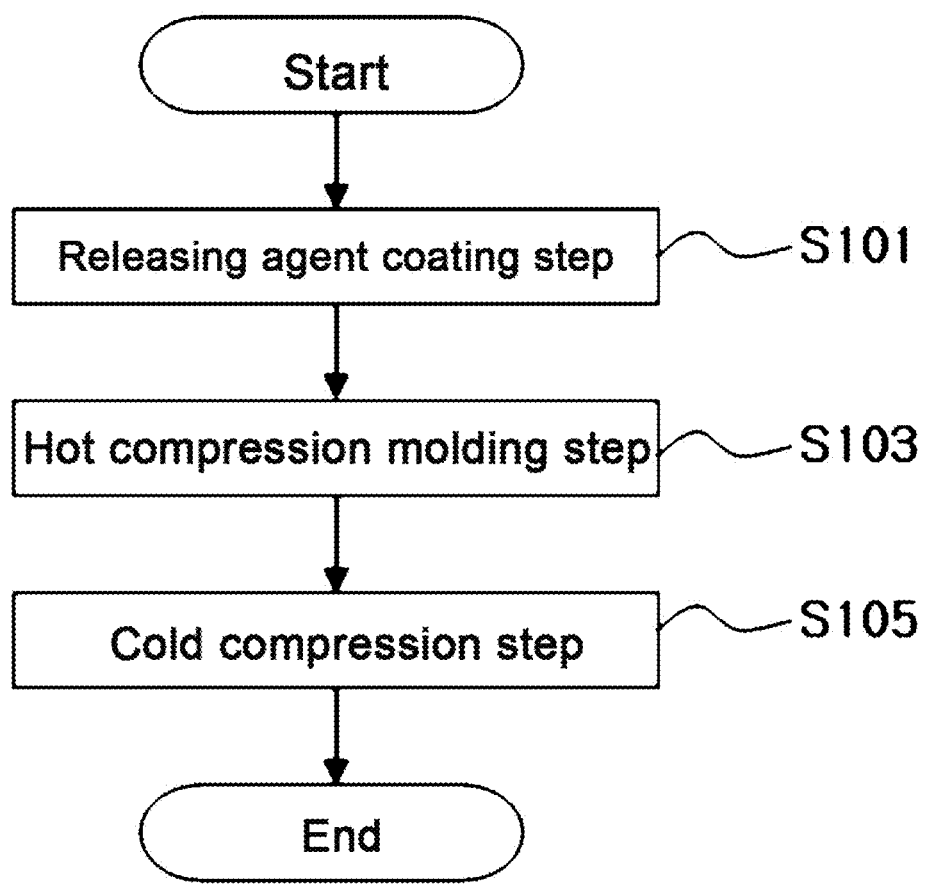
FIG. 1 shows a flow chart describing a method for molding a highly heat-resistant sound absorbing and insulating material according to an exemplary embodiment of the present invention.

Hereinafter, specific exemplary embodiments of the present invention will be described in detail. However, they are only intended to describe the present invention in detail such that those of ordinary skill in the art to which the present invention belongs can easily carry out the invention and the technical idea and scope of the present invention are not limited by them.

A method for molding a highly heat-resistant sound absorbing and insulating material according to the present invention includes: a releasing agent coating step S101 of coating a releasing agent inside a hot die; a hot compression molding step S103 of fixing a shape of a sound absorbing material; and a cold compression step S105 of stabilizing the shape.

In the releasing agent coating step S101, a spray-up type releasing agent prepared by diluting an emulsion with water to a concentration of 10-90% is uniformly coated onto top and bottom surfaces inside the hot die in an amount of 20-100 g/m$^2$. The releasing agent serves to prevent the highly heat-resistant sound absorbing and insulating material from being attached to the hot die during molding. When the coating amount of the releasing agent is less than 20 g/m$^2$, severe fluffing may occurs as the highly heat-resistant sound absorbing and insulating material becomes attached to the hot die. And, when the coating amount of the releasing agent greater than 100 g/m$^2$, the surface of the highly heat-resistant sound absorbing and insulating material may be contaminated. Accordingly, the above-described range is preferred.

Specifically, the emulsion may be one or more selected from the group consisting of a silicon-based emulsion and a fluorine-based emulsion.

In the hot compression molding step S103, a sound absorbing material containing 20-80 parts by weight of a fiber material having a limiting oxygen index (LOI) of 25% or greater and a heat resistance temperature of 200° C. or greater and 20-80 parts by weight of a thermosetting binder resin having a heat resistance temperature of 200° C. or greater is installed on the hot die, which is coupled with hot press, and hot compression is performed at a pressure of 60-200 kgf/cm$^2$ for 60-300 seconds with the surface temperature of the hot die maintained at 150-230° C. As a result, the shape of the highly heat-resistant sound absorbing and insulating material is fixed. When the surface temperature of the hot die is below 150° C., exfoliation may occur as the thermosetting binder resin existing in the core part of the highly heat-resistant sound absorbing and insulating material is not cured. And, when the surface temperature of the hot die is above 230° C., discoloration may occur due to the browning of the thermosetting binder resin, thereby causing a problem in appearance quality. When the pressure is less than 60 kgf/cm$^2$, exfoliation may occur at the volume part of the highly heat-resistant sound absorbing and insulating material. And, when the pressure is greater than 200 kgf/cm$^2$, a problem in appearance quality may occur as the surface of the compressed part of the highly heat-resistant sound absorbing and insulating material becomes slippery. When the hot compression time is less than 60 seconds, exfoliation may occur as the thermosetting hinder resin existing in the core part of the highly heat-resistant sound absorbing and insulating material is not cured. And, when the hot compression time is greater than 300 seconds, a problem in appearance quality may occur as discoloration occurs due to the browning of the thermosetting binder resin and as the surface of the compressed part of the highly heat-resistant sound absorbing and insulating material becomes slippery. Accordingly, the above-described ranges are preferred.

In the present invention, as a fiber material constituting the sound absorbing material, a heat-resistant fiber having a limiting oxygen index (LOI) of 25% or greater and a heat resistance temperature of 200° C. or greater is used. The heat-resistant fiber may be any one that has superior durability so as to endure high-temperature and ultra-high-temperature conditions. Specifically, a heat-resistant fiber having a limiting oxygen index (LOI) of 25-80% and a heat resistance temperature of 200-3000° C. may be used. More specifically, a heat-resistant fiber having a limiting oxygen index (LOI) of 25-70% and a heat resistance temperature of 200-1000° C. may be used. And, the heat-resistant fiber may have a fineness of 1-15 denier, specifically 1-6 denier, and a yarn length of 20-100 mm, specifically 40-80 mm.

As the fiber material, one known as 'superfiber' in the related art may be used. Specifically, the superfiber may be one or more selected from the group consisting of an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber. Specifically, an aramid fiber may be used as the heat-resistant fiber in the present invention. Specifically, a meta-aramid (m-aramid) fiber, a para-aramid (p-aramid) fiber or a mixture thereof may be used as the heat-resistant fiber in the present invention. The fiber material is a base material of the highly heat-resistant sound absorbing and insulating material and serves to reduce noise transferred to the inside of a vehicle by absorbing the noise radiating from an engine or an exhaust system.

Although a heat-resistant fiber is used as the fiber material constituting the sound absorbing material in the present invention, another fiber may be further included in addition to the yarn of the heat-resistant fiber for the purpose of cost reduction, weight decrease, functionality, and the like. That is to say, although the sound absorbing material of the present invention is prepared from a heat-resistant fiber as a yarn, it is not limited to a sound absorbing material consisting only of a heat-resistant fiber. The heat-resistant fiber yarn included in the sound absorbing material of the present invention may be included in an amount of 30-100 wt %, more specifically 60-100 wt %, based on the total weight of the fiber material.

In the present invention, a nonwoven fabric prepared by needle punching to have a thickness of 3-20 mm and a density of 100-2000 g/m$^2$ may be used as the fiber material. Sound-absorbing performance may vary depending on the thickness and density of the nonwoven fabric. It is expected that the sound-absorbing performance will be increased with increasing thickness and density of the nonwoven fabric. When considering the industrial application, and the like of the sound absorbing and insulating material of the present invention, it is preferred that the nonwoven fabric has a thickness of 3-20 mm. When the thickness of the nonwoven fabric is less than 3 mm, the durability and moldability of the sound absorbing and insulating material may be unsatisfactory. And, when the thickness is greater than 20 mm, productivity may decrease and production cost may increase during manufacturing and processing the nonwoven fabric. In addition, the density of the nonwoven fabric may be 100-2000 g/m$^2$, specifically 200-1200 g/m$^2$, more specifically 300-800 g/m$^2$, in the aspects of performance and cost. The nonwoven fabric may be formed by stacking a web of 30-100 g/m$^2$ which is formed by carding 2- to 12-fold and continuously performing up-down preneedling, down-up needling and up-down needling, thereby forming physical bridges and providing the desired thickness, binding strength and other desired physical properties. The needle used to perform the needling may be a barb-type needle, having a working blade of 0.5-3 mm and a needle length (crank outside-to-point distance) of 70-120 mm. Specifically, the needle stroke may be 30-350 times/m². More specifically, the fineness of the yarn for the nonwoven fabric may be 1.5-8.0 denier, the thickness of the pile layer may be 6-13 mm, the needle stroke may be 120-250 times/m², and the density of the nonwoven fabric may be 300-800 g/m².

The sound absorbing material of the present invention further contain a thermosetting binder resin in addition to the fiber material.

Specifically, a 'binder-impregnated nonwoven fabric' which contains a nonwoven fabric containing 30-100 wt % of a heat-resistant fiber based on the total weight of the nonwoven fabric, a thermosetting binder resin which is located in the same layer as the nonwoven fabric and is impregnated in the nonwoven fabric while maintaining its three-dimensional shape may be used as the sound absorbing material of the present invention. The thermosetting binder resin, which is impregnated in the nonwoven fabric, is distributed uniformly on the entire fiber yarn surface of the nonwoven fabric and maintains or further forms irregular vent holes, thereby maintaining the intrinsic three-dimensional shape of the nonwoven fabric.

The nonwoven fabric has a structure in which fibers are randomly arranged in three dimensions, although there may be some variations depending on the manufacturing method. Therefore, the inside of the nonwoven fabric may have a very complicated, three-dimensionally interconnected labyrinth structure, which is formed by regularly or irregularly arranged fibers, may be, rather than bundles of independent capillary tubes. Thus, the nonwoven fabric formed by needle punching may have irregular vent holes (microcavities) formed as the yarns containing the heat-resistant fiber loosely cross one another. When the nonwoven fabric is immersed in a thermosetting binder resin solution, the binder may be finely and uniformly distributed and attached on the surface of the nonwoven fabric yarns, thereby forming smaller-sized vent holes as compared to before the impregnation. The formation of fine vent holes in the internal structure of the nonwoven fabric provides an extended resonance path of noise, and thus, provides improved sound-absorbing performance. When the thermosetting binder resin forms a three-dimensional network structure as it is cured, the sound-absorbing performance can be further improved by forming more and finer vent holes inside the nonwoven fabric. Accordingly, since the nonwoven fabric may maintain the intrinsic three-dimensional shape as the thermosetting binder resin is uniformly impregnated into the nonwoven fabric, and additionally, since more fine vent holes (microcavities) may be formed as the thermosetting binder resin is cured, the sound absorbing and insulating material of the present invention may have remarkably improved sound-absorbing performance due to the maximized noise absorption through the increased resonance of noise in the nonwoven fabric.

The thermosetting binder resin is a material which has entirely different physical and chemical properties when compared with the heat-resistant fiber used as the fiber material in the present invention. Therefore, when the thermosetting binder resin is impregnated in the nonwoven fabric formed of the thermoplastic heat-resistant fiber, an interfacial layer is formed through edge-to-edge contact due to the difference in properties and, as a result, the vent holes of the nonwoven fabric remain open. That is to say, the thermosetting binder resin impregnated into the nonwoven fabric formed of the heat-resistant fiber can maintain the three-dimensional structure inside the nonwoven fabric.

In addition, the thermosetting binder resin is curable by light, heat or a curing agent and its shape does not change even under a high-temperature condition. Accordingly, in accordance with the present invention, the shape of the sound absorbing material can be maintained even under a high-temperature condition after molding by employing the heat-resistant fiber and the thermosetting binder resin under specific conditions. As a consequence, when the binder-impregnated nonwoven fabric wherein the thermosetting binder resin is impregnated in the nonwoven fabric formed of a heat-resistant fiber as the sound absorbing material is used, molding into a desired shape is possible during the curing of the thermosetting binder resin and the shape can be maintained even under a high-temperature condition.

Specifically, the thermosetting binder resin may be an epoxy resin. The epoxy resin is one of thermosetting binder resins and is cured into a polymer martial having a three-dimensional network structure. Accordingly, since the epoxy resin forms a network structure and another vent holes when cured inside the nonwoven fabric, additional fine vent holes may be formed inside the nonwoven fabric and the sound-absorbing performance may be further improved.

The epoxy resin may be one or more epoxy resin selected from the group consisting of bisphenol A diglycidyl ether, bisphenol B diglycidyl ether, bisphenol AD diglycidyl ether, bisphenol F diglycidyl ether, bisphenol S diglycidyl ether, polyoxypropylene diglycidyl ether, bisphenol A diglycidyl ether polymer, phosphazene diglycidyl ether, bisphenol A novolac epoxy, phenol novolac epoxy resin and o-cresol novolac epoxy resin. More specifically, the epoxy resin may have an epoxy equivalent of 70-400. When the epoxy equivalent is too low, intermolecular binding may be too weak to form the three-dimensional network structure or the physical properties of the sound absorbing and insulating material may become unsatisfactory because of reduced adhesion with the heat-resistant fiber. In contrast, when the epoxy equivalent is too high, the sound-absorbing performance may be unsatisfactory because an excessively dense network structure is formed.

When the curing is carried out in the presence of a curing agent, a more complicated three-dimensional network structure may be formed, and thus, the sound-absorbing effect may be further improved. In detail, a three-dimensional network-structured polymer may be formed as the epoxide groups or hydroxyl groups of the epoxy resin react with the functional groups of the curing agent such as amine groups or carboxylic acid groups to form covalent crosslinkages. The curing agent serves as a catalyst that catalyzes curing reaction and is involved in the reaction and linked to the chemical groups of the epoxy resin. Accordingly, the size and physical properties of the vent holes may be controlled by selecting different curing agents.

The thermosetting binder resin may further contain commonly used additives such as a curing agent and a catalyst and solvents in addition to the epoxy resin. Specifically, the thermosetting binder resin may contain an epoxy resin, 1-20 wt % of a curing agent based on the weight of the epoxy resin, 1-10 wt % of a catalyst based on the weight of the epoxy resin and 10-40 wt % of a flame retardant based on the weight of the epoxy resin. The thermosetting binder resin serves as a material that binds the fiber material constituting the highly heat-resistant sound absorbing and insulating material and maintains the shape of the highly heat-resistant sound absorbing and insulating material.

As the curing agent, a compound having a functional group that may readily react with the functional groups of the thermosetting binder resin such as epoxide groups or hydroxyl groups may be used. For example, an aliphatic amine, an aromatic amine, an acid anhydride, urea, an amide, imidazole, etc. may be used as the curing agent. As specific examples of the curing agent, one or more selected from the group consisting of diethyltoluenediamine (DETDA), diaminodiphenylsulfone (DDS), boron trifluoride-monoethylamine ($BF_3$.MEA), diaminocyclohexane (DACH), methyltetrahydrophtalic anhydride (MTHPA), methyl-5-norbornene-2,3-dicarboxylic anhydride (NMA), dicyandiamide (Dicy), 2-ethyl-4-methylimidazole may be used. More specifically, an aliphatic amine- or amide-based curing agent may be used due to improved crosslinking ability and very superior chemical resistance and weather resistance. In particular, dicyandiamide (Dicy) may be used in consideration of crosslinking ability, flame retardancy, heat resistance, storage stability, processability, and the like. Since dicyandiamide (Dicy) has a high melting point above 200° C., it may provide superior storage stability after being mixed with the epoxy resin and may ensure sufficient processing time for curing and molding.

In the present invention, a catalyst that facilitates the curing of the thermosetting binder resin used as the binder may be used. The catalyst may be one or more selected from the group consisting of urea, dimethylurea, a tetraphenylborate salt of quaternary DBU, and quaternary phosphonium bromide. The catalyst may be contained in the binder-containing solution.

In addition, various additives, for example, a flame retardant, a heat resistance improver, a water repellent and the like may be used to provide additional functionalities to the sound absorbing and insulating material. The additive may be contained in the binder solution, and thus, no additional surficial material for providing functionalities to the sound absorbing and insulating material is necessary. The flame retardant may be a melamine, a phosphate, a metal hydroxide, and the like. Specifically, the flame retardant may be one or more selected from the group consisting of melamine, melamine cyanurate, melamine polyphosphate, phosphazene, ammonium polyphosphate, and the like. More specifically, the flame retardant may be melamine, which enhances flame retardancy and heat resistance simultaneously. The heat resistance improver may be alumina, silica, talc, clay, glass powder, glass fiber, metal powder, and the like. And, one or more fluorine-based water repellent may be used as the water repellent. In addition, additives commonly used in the related art may be selected depending on desired purposes. The solvent may be one or more selected from the group consisting of a ketone, a carbonate, an acetate, a cellosolve, and the like. Specifically, the solvent may be one or more selected from the group consisting of acetone, methyl ethyl ketone (MEK), methyl isobutyl ketone (MIBK), dimethyl carbonate (DMC), ethyl acetate, butyl acetate, methyl cellosolve, ethyl cellosolve, and butyl cellosolve.

The content of the thermosetting binder resin in the sound absorbing material may be controlled by the compression pressure during the immersion in the binder solution and the temperature during drying. Specifically, the compression may be performed at a pressure of 1-20 $kgf/cm^2$ using a commonly used compression roller. As a result, a binder-impregnated nonwoven fabric having a density of 1,000-3,000 $g/m^2$ may be formed. Specifically, the compression may be performed using a compression roller, e.g., a mangle roller, at a pressure of 5-15 $kgf/cm^2$ to form a binder-impregnated nonwoven fabric having a density of 1,000-2,000 $g/m^2$. And, the drying may be performed in an oven at 70-200° C., specifically 100-150° C., for 1-10 minutes.

The content of the thermosetting binder resin in the sound absorbing material may determine the size, shape and distribution of the vent holes inside the sound absorbing and insulating material. Accordingly, the sound-absorbing property and mechanical property of the sound absorbing and insulating material may be controlled therewith. Specifically, the compressed and dried binder-impregnated nonwoven may contain 1-300 parts by weight, more specifically 30-150 parts by weight, of the thermosetting binder resin based on 100 parts by weight of the nonwoven material.

Figure 2:
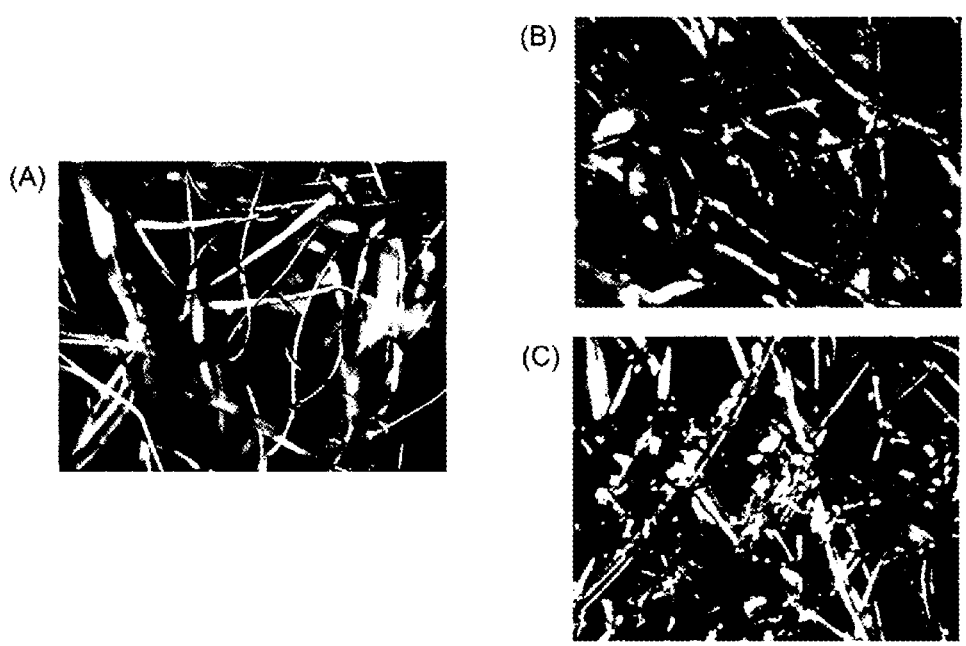
FIG. 2 shows electron microscopic images (×300) of nonwoven fabrics before and after impregnation of a thermosetting binder resin.

FIG. 2 shows electron microscopic images showing the three-dimensional shape of nonwovens fabric before and after impregnation of a thermosetting binder resin.

FIG. 2(A) is an electron microscopic image showing the internal structure of a nonwoven fabric before impregnation of a thermosetting binder resin. It can be seen that heat-resistant fiber yarns cross each other to form irregular vent holes. FIGS. 2(B) and (C) are electron microscopic images showing the internal structure of the nonwoven fabric after impregnation of a thermosetting binder resin. It can be seen that the binder is finely and uniformly distributed and attached to the heat-resistant fiber yarns and that the content of the binder on the yarn surface increases as the content of the binder increases.

As can be seen from the electron microscopic images of FIG. 2, in the sound absorbing and insulating material of the present invention, the thermosetting binder resin is uniformly distributed on the surface of the heat-resistant fiber yarns constituting the nonwoven fabric.

In the cold compression step S105, the highly heat-resistant sound absorbing material the shape of which is fixed in the hot compression molding step S103 is installed on a cold die coupled with one selected from the group consisting of a cold press and a compression jig and then cold compression is performed for 5 seconds or longer with the surface temperature of the cold die maintained at 20-40° C. In this step, the shape of the highly heat-resistant sound absorbing and insulating material which has been loosely fixed in the hot compression molding step S103 is stabilized. It costs a lot to maintain the surface temperature of the cold die at 20° C. or less. And, when the surface temperature of the cold die is greater than 40° C., the rigidity of the highly heat-resistant sound absorbing and insulating material may decrease. Accordingly, the above-described range is preferred. When the cold compression time is less than 5 seconds, the shape of the highly heat-resistant sound absorbing and insulating material may not be stabilized completely. Accordingly, to ensure product rigidity and quality stabilization, the cold compression time may be maintained for 5 seconds or greater, in particular, for 30-60 seconds.

The present invention also provides a method for reducing noise of a noise generating device, including: i) identifying the three-dimensional shape of a noise generating device; ii) molding a sound absorbing and insulating material by the method according to any of claims 1 to 15 so as to correspond partially or entirely to the three-dimensional shape of the device; and iii) bringing the sound absorbing and insulating material adjacent to the noise generating device.

The device refers to any noise generating device including a motor, an engine, an exhaust system, and the like. However, the device of the present invention would not be limited to the motor, engine, exhaust system and the like. The sound absorbing and insulating material may be manufactured to correspond partially or entirely to the three-dimensional structure of the device. Since the sound absorbing and insulating material of the present invention may be molded during the curing of the thermosetting binder resin, the sound absorbing and insulating material of the present invention may be molded to correspond partially or entirely to the three-dimensional shape of the device.

As used herein, the expression "adjacent" may mean closely attaching the sound-absorbing material to the noise generating device, installing the sound absorbing and insulating material to be spaced apart from the noise generating device or molding the sound absorbing and insulating material as a part of the noise generating device. Further, the expression "adjacent" in the present invention may include installing the sound-absorbing material on a member (e.g., another sound absorbing and insulating material) connected to the noise generating device.

Figure 3:
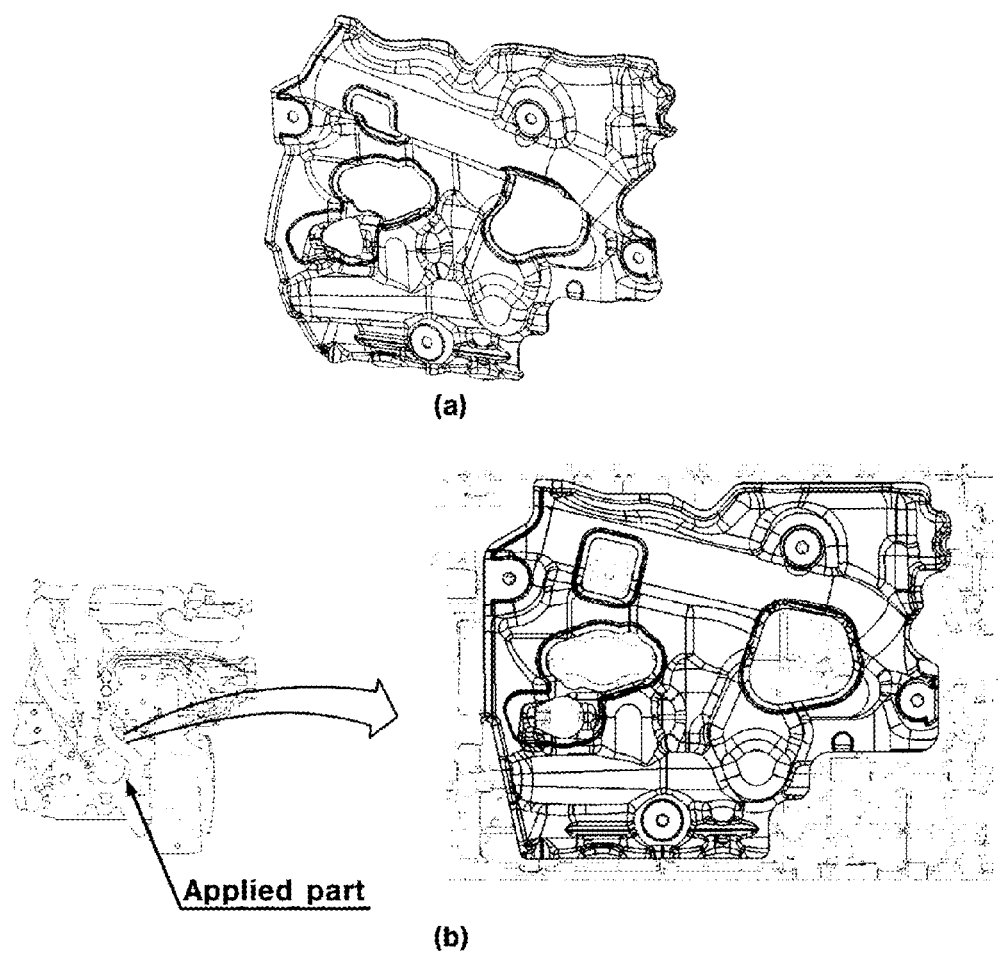
FIG. 3 schematically shows an example wherein a sound absorbing and insulating material is molded and applied to a noise generating device of a vehicle.
Figure 4:
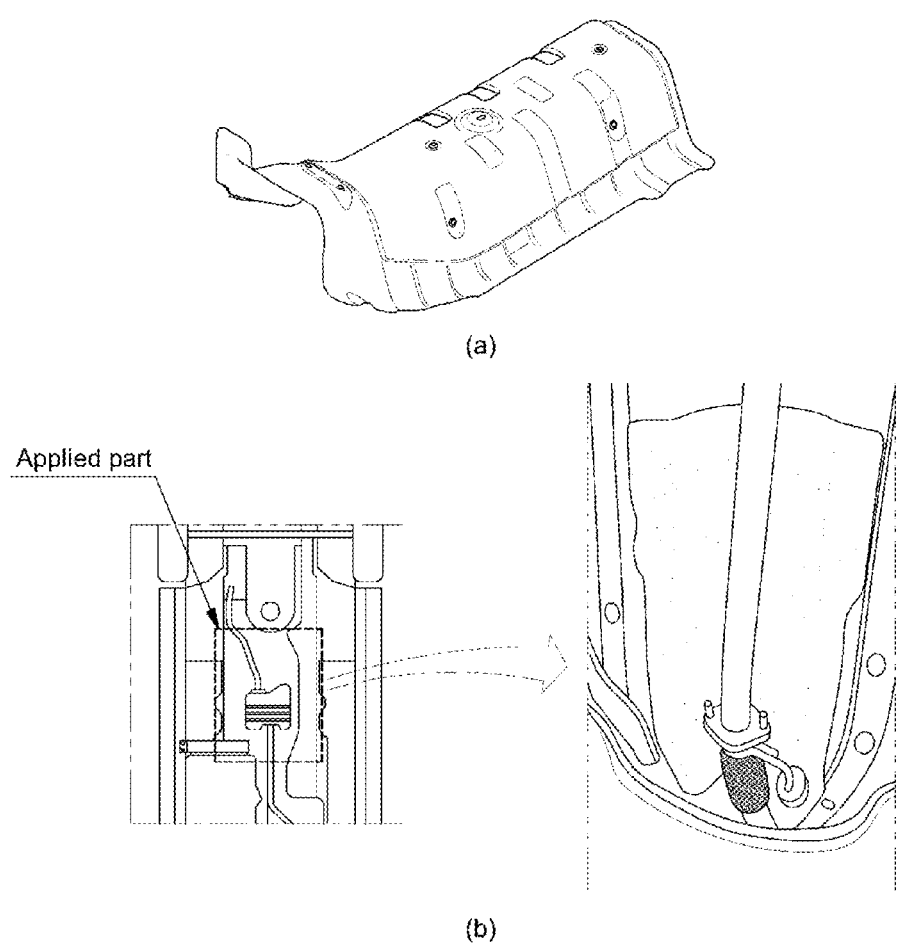
FIG. 4 schematically shows an example wherein a sound absorbing and insulating material is applied to a noise generating device of a vehicle to be spaced apart from the noise generating device.

FIG. 3 and FIG. 4 schematically show representative examples wherein the sound absorbing and insulating material of the present invention is applied to a noise generating device of a vehicle.

FIG. 3 schematically shows an example wherein the sound absorbing and insulating material is molded and applied as a part of a noise generating device of a vehicle. (a) shows an image of the sound absorbing and insulating material molded for use in a vehicle engine, and (B) shows an image of the sound absorbing and insulating material installed on a part of a vehicle engine.

And, FIG. 4 schematically shows an example wherein the sound absorbing and insulating material is applied to a noise generating device of a vehicle to be spaced apart from the noise generating device. (a) shows an image of the sound absorbing and insulating material molded for use in a lower part of a vehicle, and (B) shows an image of the sound absorbing and insulating material installed on a lower part of a vehicle.

As described above, since the sound absorbing and insulating material of the present invention has superior sound-absorbing performance, flame retardancy, heat resistance and heat-insulating property, it can exert its inherent sound absorbing and insulating effect when applied to a noise generating device maintained not only at normal temperatures but also at high temperatures of 200° C. or greater without deformation of the molded product.

EXAMPLES

Hereinafter, a method for preparing a sound absorbing material used to manufacture a highly heat-resistant sound absorbing and insulating material according to the present invention and a method for molding the sound absorbing and insulating material using the sound absorbing material will be described through preparation examples and examples.

Preparation Examples

Preparation of Sound Absorbing Material

Preparation Example 1

Epoxy Resin-Impregnated Aramid Laminated Sound Absorbing Material

A sound absorbing material was prepared by spraying an epoxy-based thermosetting binder resin onto one side of a sound absorbing material containing 67 parts by weight of a meta-aramid (m-aramid) fiber and 33 parts by weight of an epoxy-based thermosetting binder resin and having a surface density 450 g/m$^2$, to 30 g/m$^2$, and laminating thereon another sound absorbing material containing 67 parts by weight of a meta-aramid (m-aramid) fiber and 33 parts by weight of an epoxy-based thermosetting binder resin and having a surface density of 450 g/m$^2$.

Preparation Example 2

Aramid Nonwoven Fabric Sound Absorbing Material

A meta-aramid short fiber having a limiting oxygen index (LOI) of 40%, a heat resistance temperature of 300° C., a fineness of 2 denier and a length of 51 mm was beaten by air blowing and formed into a web of 30 g/m$^2$ by carding method. The web was stacked by overlapping 10-fold on a conveyor belt operated at 5 m/min using a horizontal wrapper. An aramid nonwoven fabric having a density of 300 g/m$^2$ and a thickness of 6 mm was prepared by continuously performing up-down needling, down-up needling and up-down needling with a needle stroke of 150 times/m$^2$.

Preparation Example 3

Epoxy Resin-Impregnated Aramid Nonwoven Fabric Sound Absorbing Material

The aramid nonwoven fabric prepared in Preparation Example 2 was immersed in a binder solution with 1 dip 1 nip (pick-up rate=300%). The binder solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the binder solution. A binder-impregnated nonwoven fabric of 1,500 g/m$^2$ was prepared by compressing the aramid nonwoven fabric at a pressure of 8 kgf/cm$^2$ using a mangle roller. The organic solvent was removed by drying the binder-impregnated nonwoven fabric at 150° C. such that 300 g/m$^2$ of the binder remained. As a result, a thermosetting felt of 600 g/m$^2$ was prepared.

Preparation Example 4

Epoxy Resin-Coated Aramid Nonwoven Fabric Sound Absorbing Material

The aramid nonwoven fabric prepared in Preparation Example 2 was coated with an epoxy resin such that the coating amount of the binder was 50 parts by weight based on 100 parts by weight of the nonwoven and then dried at 150° C.

The coating solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate.

Preparation Example 5

Thermoplastic Resin-Impregnated Aramid Nonwoven Sound Absorbing Material

A thermoplastic resin-impregnated aramid nonwoven fabric was prepared by immersing the aramid nonwoven fabric prepared in Preparation Example 2 in a thermoplastic binder resin solution.

The thermoplastic binder resin solution contained 10 wt % of polyethylene resin, 10 wt % of melamine cyanurate and 80 wt % of dimethyl carbonate (DMC), based on the total weight of the thermoplastic binder solution.

Preparation Example 6

Epoxy Resin-Impregnated PET Nonwoven Fabric Sound Absorbing Material

A polyethylene terephthalate (PET) nonwoven fabric having a density of 300 g/m² and a thickness of 6 mm was prepared by needle punching as described in Preparation Example 3, which was then immersed in a binder solution to prepare an epoxy resin-impregnated PET nonwoven fabric.

The binder solution contained 8 wt % of bisphenol A diglycidyl ether, 2 wt % of bisphenol A diglycidyl ether polymer, 0.2 wt % of dicyandiamide, 0.02 wt % of dimethylurea, 10 wt % of melamine cyanurate and 79.78 wt % of dimethyl carbonate, based on the total weight of the binder solution.

Examples

Preparation of Sound Absorbing and Insulating Material

Example 1

A spray-up type releasing agent prepared by diluting a silicon-based emulsion with water to a concentration of 33% was uniformly coated onto top and bottom surfaces inside a hot die in an amount of 60 g/m². Then, the sound absorbing material prepared in Preparation Example 1 was hot compression molded by compressing for 200 seconds at a pressure of 150 kgf/cm² with the surface temperature of the hot die maintained at 195±5° C., thereby fixing the shape of the sound absorbing material. Subsequently, the shape of the sound absorbing material was stabilized by performing cold compression for 60 seconds the surface temperature of a cold die coupled with a compression jig maintained at 30° C. As a result, a highly heat-resistant sound absorbing and insulating material was molded.

Examples 2-6

Highly heat-resistant sound absorbing and insulating materials were molded in the same manner as in Example 1, except that the sound absorbing materials prepared in Preparation Examples 2-6 were used, respectively.

The PET nonwoven fabric of Preparation Example 6 showed thermal deformation due to the reaction heat generated during the epoxy curing process and showed complete thermal deformation during the hot compression molding process. As a result, molding to a desired shape was impossible.

Comparative Example 1

A highly heat-resistant sound absorbing and insulating material was molded in the same manner as in Example 1, except that the releasing agent was coated onto the top and bottom surfaces inside the hot die in an amount of less than 20 g/m².

Comparative Example 2

A highly heat-resistant sound absorbing and insulating material was molded in the same manner as in Example 1, except that the releasing agent was coated onto the top and bottom surfaces inside the hot die in an amount exceeding 100 g/m².

Comparative Example 3

A highly heat-resistant sound absorbing and insulating material was molded in the same manner as in Example 1, except that the surface temperature of the hot die was maintained below 150° C.

Comparative Example 4

A highly heat-resistant sound absorbing and insulating material was molded in the same manner as in Example 1, except that the surface temperature of the hot die was maintained above 230° C.

The shape of the sound absorbing and insulating materials molded in Example 1 and Comparative Examples 1-4 is shown in FIGS. 5(a)-5(e).

TABLE 1

Figure 5:
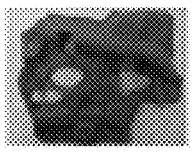
FIG. 5 shows shapes of exemplary sound absorbing and insulating materials.
Figure 5:
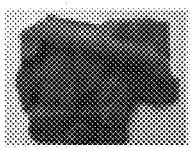
Figure 5:
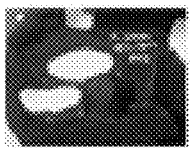
Figure 5:
Figure 5:
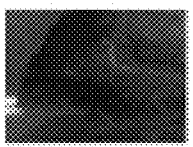

|  | Example 1 | Comparative Example 1 | Comparative Example 2 | Comparative Example 3 | Comparative Example 4 |
| --- | --- | --- | --- | --- | --- |
| Shape | FIG. 5 (a) | FIG. 5 (b) | FIG. 5 (c) | FIG. 5 (d) | FIG. 5 (e) |
| Result | No abnormality | Surface fluffing | Surface whitening | Peeling | Surface browning |

As can be seen from Table 1, the highly heat-resistant sound absorbing and insulating material molded according to the present invention has superior appearance quality.

To evaluate the performance of the highly heat-resistant sound absorbing and insulating material prepared in Example 1, a 3rd gear W.O.T PG test was conducted on a diesel vehicle (U2 1.7). The result is shown in Table 2. Further, a result of measuring noise inside the vehicle under an idle neutral gear is shown in Table 3.

TABLE 2

|  | Product weight | 3rd gear W.O.T 2,000-4,000 rpm AI (%) average | |
| --- | --- | --- | --- |
|  | (g) | Front seat | Back seat |
| Not installed | 0 | 80 | 76 |
| Installed | 66 | 82 | 79.8 |

TABLE 3

|  | Product weight | Neutral gear idle 400-6,300 Hz dB(A) rms | |
| --- | --- | --- | --- |
|  | (g) | Front seat | Back seat |
| Not installed | 0 | 39 | 36.2 |
| Installed | 66 | 37.8 | 35.3 |

As can be seen from Table 2 and Table 3, when the highly heat-resistant sound absorbing and insulating material molded according to the method for molding a highly heat-resistant sound absorbing and insulating material according to the present invention was applied, booming noise was improved by 2-3.8% and the noise inside the vehicle was improved by 0.9-1.2 dB(A) when 66 g of the highly heat-resistant sound absorbing and insulating material was applied.

Test Examples

Evaluation of Physical Properties of Sound Absorbing and Insulating Material

The physical properties of the sound absorbing and insulating materials were measured and compared as follows.

1. Evaluation of Heat Resistance

To evaluate heat resistance, the sound absorbing and insulating material was aged in an oven at 260° C. for 300 hours. After keeping at standard state (23±2° C., relative humidity of 50±5%) for at least 1 hour, appearance was inspected and tensile strength was measured. The appearance was visually inspected as to whether there was shrinkage, deformation, surface peeling, fluffing or cracking. The tensile strength was measured for five sheets of randomly selected dumbbell-type No. 1 test specimens at a speed of 200 mm/min under a standard condition.

2. Evaluation of Thermal Cycle

The durability of the sound absorbing and insulating material was evaluated by a thermal cycle test. The durability was determined after performing five cycles.

1) Condition of One Cycle

Room temperature→high temperature (150° C.×3 hr)→room temperature→low temperature (−30° C.×3 hr)→room temperature→humid condition (50° C.×95% RH).

2) Durability Evaluation Standard

After the thermal cycle test, the change in appearance was inspected. For example, surface damage, swelling, breaking and discoloring were inspected. If there was no change in appearance, it was evaluated as 'no abnormality'.

3. Evaluation of Flame Retardancy

The flame retardancy of the sound absorbing and insulating material was measured according to the ISO 3795 flammability test.

4. Evaluation of Nonflammability

The nonflammability of the sound absorbing and insulating material was measured according to the UL94 vertical burn test.

5. Evaluation of Sound-Absorbing Property

The sound-absorbing performance of the sound absorbing and insulating material was measured according to ISO 354.

6. Evaluation of Air Permeability

1) Evaluation Method

The test specimen was mounted on a Frazier-type tester and the amount of air flowing through the test specimen vertically was measured. The area of the test specimen through which air passed was 5 cm² and the applied pressure was set to 125 pascal (Pa).

Test Example 1

Comparison of Properties of Sound Absorbing and Insulating Materials Depending on Heat-Resistant Fibers In Test Example 1, the physical properties of sound absorbing and insulating materials prepared with different heat-resistant fiber yarns as sound absorbing materials were compared. The epoxy resin-impregnated nonwoven fabrics prepared in Preparation Example 3 were used as the sound absorbing materials. For needle punching, yarns having a fineness of 2 denier and a length of 51 mm were used (see Table 5). Then, the sound absorbing and insulating materials were molded according to the method described in Example 1.

The results of measuring the properties of the sound absorbing and insulating materials prepared with different heat-resistant fibers as the sound absorbing materials are shown in Table 4 and Table 5.

TABLE 4

|  |  | Yarn 1 | Yarn 2 | Yarn 3 | Yarn 4 | Yarn 5 | Yarn 6 | Yarn 7 |
|---|---|---|---|---|---|---|---|---|
| Yarn | Yarn material | Aramid | PPS | PI | PBI | PBO | Oxi-PAN | PK |
|  | Limiting oxygen index | 40 | 30 | 50 | 40 | 60 | 65 | 30 |
|  | Heat resistance temperature (° C. × 1 hr) | 300 | 230 | 300 | 300 | 300 | 300 | 300 |
| Heat resistance | Appearance | No abnormality | No abnormality | No abnormality | No abnormality | No abnormality | No abnormality | No abnormality |
|  | Tensile strength (Kgf/cm²) | 200 | 180 | 220 | 200 | 210 | 210 | 200 |
| Thermal cycle | Appearance | No abnormality | No abnormality | No abnormality | No abnormality | No abnormality | No abnormality | No abnormality |
|  | Flame retardancy | Self-extinguishing | Self-extinguishing | Self-extinguishing | Self-extinguishing | Self-extinguishing | Self-extinguishing | Self-extinguishing |
|  | Nonflammability | Nonflammable | Nonflammable | Nonflammable | Nonflammable | Nonflammable | Nonflammable | Nonflammable |

TABLE 5

| | Sound-absorbing rate | | | |
|---|---|---|---|---|
| Frequency (Hz) | Yarn 1 (aramid) | Yarn 2 (PPS) | Yarn 6 (oxi-PAN) | Yarn 7 (PK) |
| 400 | 0.08 | 0.05 | 0.08 | 0.05 |
| 500 | 0.10 | 0.06 | 0.09 | 0.06 |
| 630 | 0.16 | 0.09 | 0.13 | 0.08 |
| 800 | 0.23 | 0.15 | 0.22 | 0.19 |
| 1000 | 0.35 | 0.30 | 0.35 | 0.26 |
| 1250 | 0.44 | 0.39 | 0.45 | 0.37 |
| 1600 | 0.59 | 0.49 | 0.57 | 0.31 |
| 2000 | 0.70 | 0.66 | 0.68 | 0.48 |
| 2500 | 0.79 | 0.71 | 0.80 | 0.67 |
| 3150 | 0.83 | 0.80 | 0.85 | 0.78 |
| 4000 | 0.86 | 0.83 | 0.88 | 0.84 |
| 5000 | 0.99 | 0.95 | 0.92 | 0.83 |
| 6300 | 0.98 | 0.96 | 0.98 | 0.89 |
| 8000 | 0.99 | 0.95 | 0.89 | 0.95 |
| 10000 | 0.98 | 0.97 | 0.99 | 0.95 |

As seen from Table 4 and Table 5, all the sound absorbing and insulating materials prepared using heat-resistant fibers having a limiting oxygen index of 25% or greater and a heat resistance temperature of 150° C. or greater showed satisfactory heat resistance, durability, flame retardancy, non-flammability and sound-absorbing performance. Accordingly, it can be seen that any commonly used heat-resistant fiber may be used as the sound absorbing material constituting the sound absorbing and insulating material of the present invention.

Test Example 2

Comparison of Properties of Sound Absorbing and Insulating Materials Depending on Density of Nonwoven Fabrics In Test Example 2, the physical properties of the sound absorbing and insulating materials depending on the density of nonwoven fabrics were compared. Epoxy resin-impregnated nonwoven fabrics were prepared according to the method of Preparation Example 3 as sound absorbing materials. The density of the nonwoven fabrics was varied in the needle punching step. Then, the sound absorbing and insulating materials were molded according to the method described in Example 1. The sound-absorbing performance of the prepared sound absorbing and insulating materials is shown in FIG. 6.

Figure 6:
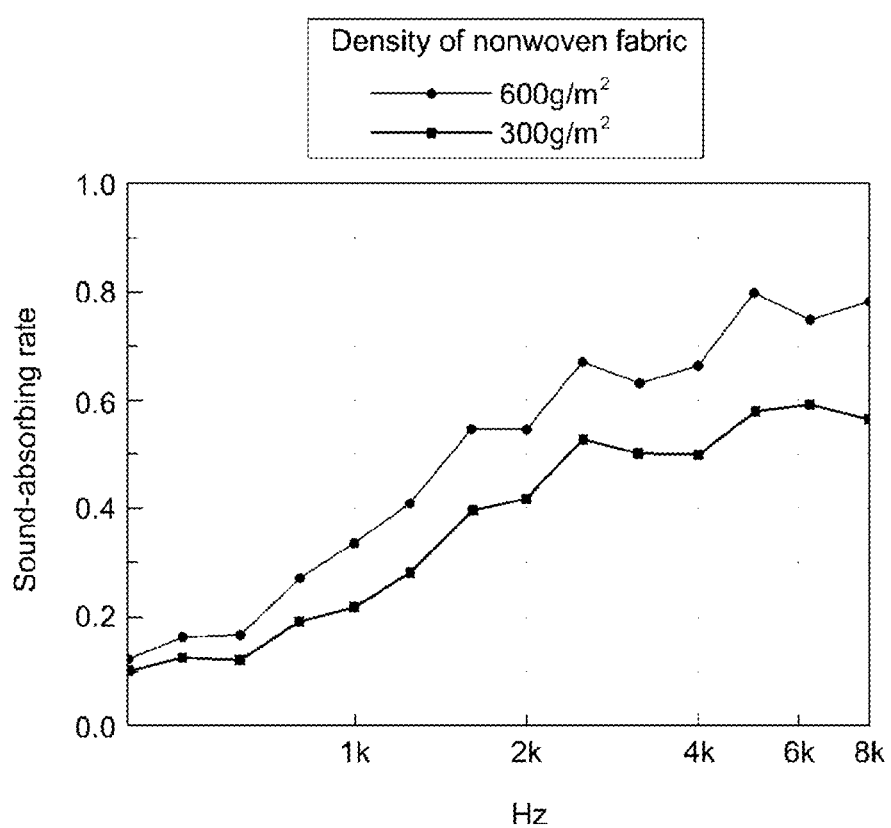
FIG. 6 compares the sound-absorbing performance of a sound absorbing and insulating material depending on the density of a nonwoven fabric.

As seen from FIG. 6, the sound-absorbing performance of the sound absorbing and insulating material was superior when the nonwoven fabric having a density of 600 g/m² was used as compared to when the nonwoven fabric having a density of 300 g/m² was used.

Test Example 3

Evaluation of Sound-Absorbing Performance of Sound Absorbing and Insulating Materials Depending on Binder Application Type In Test Example 3, the sound-absorbing performance of the sound absorbing and insulating materials depending on the application type of the thermosetting binder resin in the nonwoven fabric when preparing the sound absorbing material was compared.

That is to say, the sound-absorbing rate of the sound absorbing and insulating materials prepared by applying the thermosetting binder resin to the nonwoven fabric by impregnation or coating was measured. Table 6 shows the results of measuring the sound-absorbing rate for the sound absorbing and insulating material prepared from a nonwoven fabric (Preparation Example 2), the sound absorbing and insulating material prepared from a thermosetting binder resin-impregnated nonwoven fabric (Preparation Example 3) and the sound absorbing and insulating material prepared from a thermosetting binder resin-coated nonwoven fabric (Preparation Example 4).

TABLE 6

| | Sound-absorbing rate | | |
|---|---|---|---|
| Frequency (Hz) | Preparation Example 2 (nonwoven fabric) | Preparation Example 3 (binder-impregnated nonwoven fabric) | Preparation Example 4 (binder-coated nonwoven fabric) |
| 400 | 0.01 | 0.08 | 0.02 |
| 500 | 0.03 | 0.10 | 0.03 |
| 630 | 0.12 | 0.16 | 0.05 |
| 800 | 0.16 | 0.23 | 0.08 |
| 1000 | 0.26 | 0.35 | 0.12 |
| 1250 | 0.32 | 0.44 | 0.15 |
| 1600 | 0.39 | 0.59 | 0.22 |
| 2000 | 0.48 | 0.70 | 0.29 |
| 2500 | 0.64 | 0.79 | 0.40 |
| 3150 | 0.63 | 0.83 | 0.57 |
| 4000 | 0.72 | 0.86 | 0.68 |
| 5000 | 0.80 | 0.99 | 0.77 |
| 6300 | 0.78 | 0.98 | 0.82 |
| 8000 | 0.89 | 0.99 | 0.98 |
| 10000 | 0.90 | 0.98 | 0.98 |

As seen from Table 6, the sound absorbing and insulating material of Preparation Example 3 prepared using the thermosetting binder resin-impregnated aramid nonwoven fabric as the sound absorbing material exhibits superior sound-absorbing rate in all frequency ranges as compared to Preparation Example 2 (wherein aramid nonwoven fabric was used as the sound absorbing material). In contrast, the sound absorbing and insulating material of Preparation Example 4 wherein the thermosetting binder resin-coated nonwoven fabric was used exhibits lower sound-absorbing rate in the frequency range of 400-5000 Hz as compared to Preparation Example 2.

Test Example 4

Evaluation of Heat-Insulating Performance of Binder-Impregnated Sound Absorbing and Insulating Materials In Test Example 4, the heat-insulating performance of the sound absorbing and insulating materials prepared in Example 2 (wherein the aramid nonwoven fabric was used as the sound absorbing material) and Example 3 (wherein the thermosetting binder resin-impregnated aramid nonwoven fabric was used as the sound absorbing material) was evaluated. After applying heat of 1000° C. from one side of a 25-mm thick sound absorbing and insulating material sample for 5 minutes, temperature was measured on the opposite side of the sample.

The temperature measured on the opposite side of the sound absorbing and insulating material was 250° C. for Example 2 and 350° C. for Example 3. Accordingly, it can be seen that use of the thermosetting binder resin-impregnated fiber material as the sound absorbing material provides improved heat-insulating performance.

These results show that the sound absorbing and insulating material of the present invention has very superior heat-insulating property.

Test Example 5

Comparison of Heat-Insulating Performance with Aluminum Heat-Insulating Plate In Test Example 5, the heat-insulating performance of the sound absorbing and insulating material of Example 2 was compared with that of an aluminum heat-insulating plate.

While applying the same heat from one side of the sound absorbing and insulating material and the heat-insulating plate at 250° C., the temperature at the opposite side was measured with time. The results are shown in FIG. 7.

Figure 7:
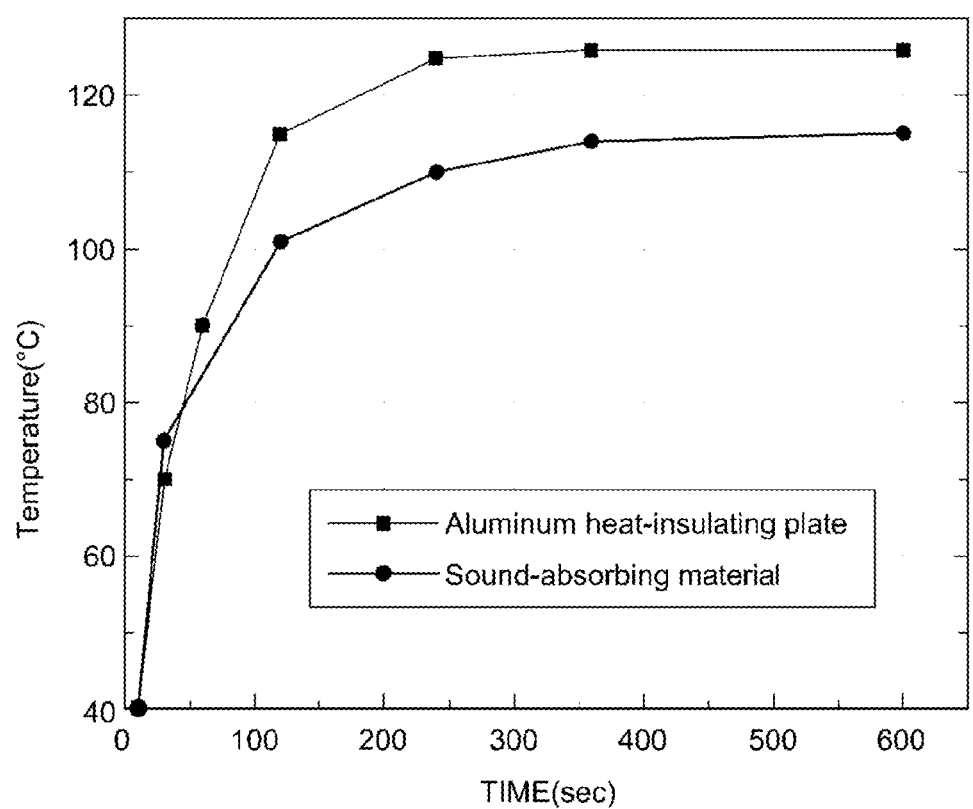
FIG. 7 compares the heat-insulating performance of a highly heat-resistant sound absorbing and insulating material manufactured according to a method for molding a highly heat-resistant sound absorbing and insulating material according to an exemplary embodiment of the present invention with that of an existing aluminum heat-insulating plate.

As seen from FIG. 7, the sound absorbing and insulating material according to the present invention exhibited better heat-insulating performance by 11° C. or greater as compared to the aluminum heat-insulating plate.

Test Example 6. Comparison of Properties of Sound Absorbing and Insulating Materials Depending on Thermosetting Binder Resin Content Sound absorbing materials were prepared as described in Preparation Example 2. The epoxy resin-impregnated aramid nonwoven fabric was dried to have different contents of the thermosetting binder resin. The thermosetting binder resin content was represented as parts by weight of the binder included in the sound absorbing and insulating material based on 100 parts by weight of the dried nonwoven fabric.

The results of comparing the mechanical properties and sound-absorbing rate of the sound absorbing and insulating materials of prepared with different thermosetting binder resin contents are shown in Table 7 and Table 8.

TABLE 7

Physical properties of sound absorbing and insulating materials with different binder contents

| Binder content (parts by weight) | 0 | 10 | 50 | 100 | 200 |
|---|---|---|---|---|---|
| Air permeability (mL/cm² · s) | 500 | 380 | 350 | 320 | 210 |
| Tensile strength (kg/cm²) | 40 | 60 | 200 | 240 | 310 |
| Flammability | Nonflammable | Nonflammable | Nonflammable | Nonflammable | Nonflammable |

TABLE 8

Sound-absorbing rate of sound absorbing and insulating materials with different binder contents

| Frequency (Hz) | 0 part by weight | 10 parts by weight | 50 parts by weight | 100 parts by weight | 200 parts by weight |
|---|---|---|---|---|---|
| 400 | 0.01 | 0.01 | 0.08 | 0.06 | 0.02 |
| 500 | 0.03 | 0.04 | 0.10 | 0.09 | 0.04 |
| 630 | 0.12 | 0.14 | 0.16 | 0.15 | 0.09 |
| 800 | 0.16 | 0.17 | 0.23 | 0.25 | 0.11 |
| 1000 | 0.26 | 0.26 | 0.35 | 0.30 | 0.14 |
| 1250 | 0.32 | 0.34 | 0.44 | 0.42 | 0.17 |
| 1600 | 0.39 | 0.41 | 0.59 | 0.54 | 0.22 |
| 2000 | 0.48 | 0.55 | 0.70 | 0.58 | 0.35 |
| 2500 | 0.64 | 0.68 | 0.79 | 0.67 | 0.44 |
| 3150 | 0.63 | 0.69 | 0.83 | 0.72 | 0.52 |
| 4000 | 0.72 | 0.77 | 0.86 | 0.75 | 0.53 |
| 5000 | 0.80 | 0.83 | 0.99 | 0.79 | 0.57 |
| 6300 | 0.78 | 0.88 | 0.98 | 0.80 | 0.63 |
| 8000 | 0.89 | 0.91 | 0.99 | 0.90 | 0.70 |
| 10000 | 0.90 | 0.92 | 0.98 | 0.92 | 0.71 |

From Table 7 and Table 8, it can be seen that the impregnation of the thermosetting binder resin in the nonwoven fabric which is used as the sound absorbing material provides improved sound-absorbing rate. In addition, it can be seen that the sound-absorbing rate of the sound absorbing and insulating material may be controlled with the content of the thermosetting binder resin.

Test Example 7

Comparison of Properties of Sound Absorbing and Insulating Materials Depending on Types of Binders Sound absorbing and insulating materials wherein 50 parts by weight of a binder was impregnated based on 100 parts by weight of an aramid nonwoven fabric were prepared according to the method of Preparation Example 3. The resins described in Table 9 were used as the binder.

The results of comparing the mechanical properties and sound-absorbing rate of the sound absorbing and insulating materials prepared with different binders are shown in Table 9.

TABLE 9

Sound-absorbing rate of sound absorbing and insulating materials with different binders

| Binder resin | Epoxy | Phenol | Urea | Melamine | Polyurethane |
|---|---|---|---|---|---|
| Heat resistance temperature (° C. × 1 hr) | 300 | 260 | 190 | 300 | 200 |
| Tensile strength (kg/cm²) | 200 | 165 | 180 | 180 | 170 |
| Flame retardancy | Self-extinguishing | Self-extinguishing | Self-extinguishing | Self-extinguishing | Self-extinguishing |
| Flammability | Nonflammable | Nonflammable | Nonflammable | Nonflammable | Nonflammable |

What is claimed is:

1. A method for molding a highly heat-resistant sound absorbing and insulating material, comprising:
    i) a releasing agent coating step of coating a releasing agent inside a hot die;
    ii) a hot compression molding step of fixing a shape of a sound absorbing material by installing a sound absorbing material comprising, based on 100 parts by weight of the sound absorbing material, 20-80 parts by weight of a fiber material having a limiting oxygen index (LOI) of 25% or greater and a heat resistance temperature of 200° C. or greater and 20-80 parts by weight of a thermosetting binder resin having a heat resistance temperature of 200° C. or greater on the hot die coated with the releasing agent; and
    iii) a cold compression step of stabilizing the fixed shape of the compressed sound absorbing material,
    wherein the sound absorbing material comprises a nonwoven fabric comprising a fiber material and a thermosetting binder resin which is located in the same layer as the nonwoven fabric and is impregnated in the nonwoven while maintaining a three-dimensional structure inside the nonwoven fabric, the thermosetting binder resin being distributed uniformly on the entire fiber yarn of the nonwoven fabric and forming smaller-sized vent holes as compared to before the impregnation of the binder.

2. The method of claim 1, wherein, in the releasing agent coating step i), a spray-up type releasing agent prepared by diluting an emulsion with water to a concentration of 10-90% is uniformly coated onto top and bottom surfaces inside the hot die in an amount of 20-100 g/m$^2$.

3. The method of claim 2, wherein the emulsion is one or more selected from the group consisting of a silicon-based emulsion and a fluorine-based emulsion.

4. The method of claim 1, wherein, in the hot compression molding step ii), the sound absorbing material is installed on the hot die coupled with a hot press and hot compression is performed at a pressure of 60-200 kgf/cm$^2$ for 60-300 seconds with the surface temperature of the hot die maintained at 150-230° C. to fix its shape.

5. The method of claim 1, wherein the sound absorbing material is prepared by immersing the nonwoven fabric in a thermosetting binder resin solution, compressing at a pressure of 1-20 kgf/cm$^2$ and then drying at 70-200° C.

6. The method of claim 5, wherein the sound absorbing material is one in which 1-300 parts by weight of the thermosetting binder resin is impregnated based on 100 parts by weight of the nonwoven fabric.

7. The method of claim 1, wherein the fiber material is one or more selected from an aramid fiber, a polyphenylene sulfide (PPS) fiber, an oxidized polyacrylonitrile (oxi-PAN) fiber, a polyimide (PI) fiber, a polybenzimidazole (PBI) fiber, a polybenzoxazole (PBO) fiber, a polytetrafluoroethylene (PTFE) fiber, a polyketone (PK) fiber, a metallic fiber, a carbon fiber, a glass fiber, a basalt fiber, a silica fiber and a ceramic fiber.

8. The method of claim 7, wherein the fiber material is one or more selected from the group consisting of a meta-aramid (m-aramid) fiber and a para-aramid (p-aramid) fiber.

9. The method of claim 1, wherein the nonwoven fabric is a single-layer nonwoven fabric formed of an aramid fiber having a fineness of 1-15 denier and a thickness of 3-20 mm.

10. The method of claim 1, wherein the nonwoven fabric has a density of 100-2000 g/m$^2$.

11. The method of claim 1, wherein the thermosetting binder resin comprises an epoxy resin, 1-20 wt % of a curing agent based on the weight of the epoxy resin, 1-10 wt % of a catalyst based on the weight of the epoxy resin and 10-40 wt % of a flame retardant based on the weight of the epoxy resin.

12. The method of claim 11, wherein the epoxy resin comprises one or more selected from the group consisting of bisphenol A diglycidyl ether, bisphenol F diglycidyl ether, polyoxypropylene diglycidyl ether, phosphazene diglycidyl ether, phenol novolac epoxy, o-cresol novolac epoxy and bisphenol A novolac epoxy.

13. The method of claim 1, wherein, in the cold compression step iii), the sound absorbing material is installed on a cold die coupled with one selected from the group consisting of a cold press and a compression jig and cold compression is performed for 5 seconds or greater with the surface temperature of the cold die maintained at 20-40° C.

14. The method of claim 1, wherein, in the cold compression step iii), the cold compression is performed for 30-60 seconds.

\* \* \* \* \*